United States Patent
Finocchio

(10) Patent No.: US 7,152,711 B2
(45) Date of Patent: Dec. 26, 2006

(54) SPLINE LUBRICATION APPARATUS FOR LUBRICATING A SPLINE

(75) Inventor: Sam D. Finocchio, Shopiere, WI (US)

(73) Assignee: Regal-Beloit Corporation, Beloit, WI (US)

( * ) Notice: Subject to any disclaimer, the term of this patent is extended or adjusted under 35 U.S.C. 154(b) by 419 days.

(21) Appl. No.: 10/601,829

(22) Filed: Jun. 23, 2003

(65) Prior Publication Data
US 2004/0256177 A1 Dec. 23, 2004

(51) Int. Cl.
F16H 57/04 (2006.01)
F01N 9/06 (2006.01)
F16N 17/26 (2006.01)

(52) U.S. Cl. .................. 184/6.12; 74/606 R; 74/665 G
(58) Field of Classification Search ............... 184/6.12, 184/11.1, 13.1; 74/606 R, 665 T, 665 G; 403/138, 277, 282, 359; 464/162
See application file for complete search history.

(56) References Cited

U.S. PATENT DOCUMENTS

| 2,708,246 | A | * | 5/1955 | Dunn .......................... 310/235 |
| 3,230,796 | A | * | 1/1966 | Thomson .................... 184/6.12 |
| 3,301,349 | A | * | 1/1967 | Williams .................... 184/11.1 |
| 3,605,523 | A | * | 9/1971 | O'Brien ....................... 475/234 |
| 3,785,458 | A | * | 1/1974 | Caldwell et al. ............ 184/6.12 |
| 4,119,168 | A | * | 10/1978 | Fogelberg .................. 74/665 G |
| 4,195,718 | A | * | 4/1980 | Schmohe .................... 464/162 |
| 4,223,579 | A | * | 9/1980 | Stark et al. .................... 408/35 |
| 4,281,942 | A | | 8/1981 | Gaeckle et al. |
| 4,470,776 | A | | 9/1984 | Kostek et al. |
| 4,669,999 | A | | 6/1987 | Miller |
| 4,810,126 | A | | 3/1989 | Lengel |
| 4,856,633 | A | | 8/1989 | Specht |
| 5,588,930 | A | * | 12/1996 | Chen .......................... 475/300 |
| 6,189,411 | B1 | | 2/2001 | Francis |

FOREIGN PATENT DOCUMENTS

JP 04-83999 A * 3/1992

* cited by examiner

Primary Examiner—Marcus Charles
(74) Attorney, Agent, or Firm—David J. Archer

(57) ABSTRACT

A spline lubrication apparatus is disclosed for lubricating a spline of a pump drive. The apparatus includes a housing and a rotatable spline disposed within the housing. The spline includes a shaft having a first and a second end and an external surface extending between the first and second ends of the spline, the external surface defining a plurality of longitudinally extending splines. A gear is rotatably supported within the housing, the gear including an internally splined bore for the rotatable reception therein of the rotatable spline. The arrangement is such that the rotatable spline extends through the bore with the plurality of splines intermeshing with the internally splined bore. A bearing has a first and a second extremity, the bearing being disposed between the gear and the housing for bearingly supporting the gear for rotation within the housing. Also, a shield is disposed adjacent to one of the extremities of the bearing for diverting a portion of a flow of lubricant flowing through the bearing so that the portion of the flow of lubricant flows through the bore between the plurality of splines and the intermeshing internally splined bore for inhibiting fretting corrosion of the intermeshing splines and splined bore.

14 Claims, 9 Drawing Sheets

SPLINE LUBRICATION APPARATUS FOR LUBRICATING A SPLINE

BACKGROUND OF THE INVENTION

1. Field of the Invention

The present invention relates to a spline lubrication apparatus for lubricating a spline. More particularly, the present invention relates to a spline lubrication apparatus for lubricating a spline of a pump drive.

2. Background Information

Spline wear is a very big factor when working with any large engine. The reason behind this is because internal combustion engines are ignited by compression. When the engine fires, there is a very strong pulse of engine rotation torque, as a piston approaches Bottom Dead Center (BDC). The inertia of the rotating parts must drive the piston back up and create a compression for the next cycle. As the inertia from the rotating parts start driving the engine, an anti-engine torque is applied. For a split second between engine and anti-engine torque, all components are in a neutral, no power state. During this time all bushings are free to, and do, move. With a dry spline the combination of this movement and torque in both directions causes excessive, premature wear. Such wear is prevented by introducing oil to the spline area. Many manufacturers use several different methods of oiling the spline. Most, if not all of these include a remote oil supply and/or a pump to get oil to a sufficient level in the spline area.

According to the present invention which includes a modular split-housing design, the wet spline feature is cast into the housing. As the gears spin, oil is distributed throughout the box. The cast ports are strategically placed to catch the maximum amount of oil and direct it to the rotating spline. Shielded bearings are used to restrict oil flow back into the sump of the gear box. This causes the oil to back up and fill the spline cavity. With oil being retained in the cavity this causes the bearings to be partially submerged, giving better lubrication benefits. The bearings also run cooler because of the oil being passed through the bearing, instead of being submerged into the main sump. An added benefit of retaining oil is during cold start conditions. In other manufacturers' designs, the bearings are oiled by splash. With cold thick oil, there is insufficient lubrication until the oil warms up. When oil is contained in the spline cavity, the bearings have lubrication upon start up, no matter what temperature or thickness of oil used. With the oil ports being cast into the housing, under normal operation, they will act as oil fill and oil level holes. This is opposed to other designs where oil ports are cast into the adapter groups. Traditionally these have four cast holes approximately 90 degrees apart. That design allows oil to flow in but would also drain out just as quickly, thus again, relying on a splash lubrication for both the bearing and the spline. Adapter groups with two ports cast therein would allow for proper oil flow and oil level. However, the attachment orientation of these adapters would be critical for proper oil retention. Having the two ports cast into the housing eliminates the need for the critical orientation of these adapter groups. A third design is to cast only two ports to allow for fill and level. This provides similar characteristics to the modular split housing design of the present invention. However, open ball bearings or taper roller bearings are used. Both of these bearings provide little to no oil retention, and actually the taper roller bearings tend to pump the oil out.

In the modular design according to the present invention, there is ease of assembly and serviceability. The modular design is built from two housing halves containing both the gears and bearings. This is different from current designs in that currently the adapters (pump pads or engine adapters) contain the bearings. This is used because in a mono-body (uni-body) housing, the gears must either be installed through the pump pad holes, or through the engine adapter hole and slid over to the proper location. The shafts are then pressed onto the gears. Finally, the covers, containing the bearings are installed. This is a very time consuming process and causes lots of difficulty in the field for repairs. Most of the time, the gear boxes must be completely disassembled from the machine and either sent to a repair site that has the proper equipment, or sent back to the manufacturer of the gear box. A modular split-housing design eliminates all of these problems. A modular split housing according to the present invention uses solid on shaft (SOS) gears in which both bearings are pressed onto the shaft. In the event the customer would require less oil in the spline area, a non-shielded bearing could be used. The housing halves contain the bearings so that when the gearbox is bolted together, all internal rotating parts are contained therein. Repairs are also simplified with a modular split housing. If anyone of the gears or bearings were to fail, the modular split housing would be able to stay attached to the engine or motor, while the second half including the pumps, would be removed. Because the pump pads do not contain the bearings, the pump would not have to be removed when disassembling. Once taken apart, the gears/bearings will slide out by hand and can be fixed or easily replaced. Again, because the modular split housing is fully contained, the end user can purchase individual adapter groups to replace or modify the original configuration. All adapters (input and output) can be added without having to disturb the box or any internal workings.

The modular-split housing uses the same gears and bearings throughout several models, because the configuration of the housings is the same. This is beneficial in two ways. For the manufacturer, fewer gears need to be produced. For the consumer, parts availability is improved, whether for service or for new pump drive orders. This will save much misunderstanding on the part of both the consumer and the manufacturer, which will speed up the process of sending repair parts. All the gears throughout the product line use the same large internal spline. With a large internal spline and with oil lubrication, fretting corrosion is theoretically eliminated. The larger splines create a common geometry in the gears, resulting in fewer parts. The benefit to the end user includes, the variety of pump spline adapters available which offers flexibility when changing pumps and the larger gear spline bore has increased rating which if and when spline wear occurs, due to excessive HP draw, the smaller pump spline will wear before the gear spline. When this happens, the bushing can be easily replaced without replacing the gear.

When producing a mono-body housing, many times residue is left in corners and covered by paint. This has been reported to come loose during operation causing bearing and/or gear failure. Because mono-body housings are so large one casting must cover all sides. This causes a potential for air pockets, and voids while pouring the casting. When a casting has voids, it reduces the integrity tremendously and also offers a place for oil to leak. With a modular split-housing according to the present invention and the resultant two housing halves, a consistent pour is more repeatable, and cleaning and inspection is much easier.

Some of the features and benefits derived from the subject invention are as follows:

1. The modular design means that the base unit can be built without the need for input and/output adapter groups. Also, the bearings and gears are self-contained within the housings. Furthermore, input and output adapters can be added at anytime prior to the installation of the unit.
2. The solid-on-shaft gears provide consistent and uniform alignment. Also, such gears simplify assembly once the bearings are pressed on the gear shaft. Additionally, such gears reduce the total number of parts.
3. The arrangement simplifies service and does not require pressing the shafts through the housings into bearings and gears. Also, the present arrangement does not require shimming or special adjustment of the pump pads and input adapters.
4. There are fewer parts and the adapter groups are reduced to a single set of input housings and output pads for the entire product line. The total of 31 gears are interchangeable across different models.
5. The wet spline includes oil passages that are built into the housings along with the bearing design to create a constant oil bath for the bearings and splines, resulting in longer, trouble-free operation.
6. The drop-in replacement arrangement enables interchangeability with present pump drive lines and with other types of pump drive lines.
7. The higher rating means an increased horsepower rating over the present product line and competition.
8. The arrangement according to the present invention provides an apparatus which also runs quieter, is less costly and which reduces lead time.

Therefore, it is a primary feature of the present invention to provide a spline lubrication apparatus for lubricating a spline of a pump drive that overcomes the problems associated with fretting corrosion or excessive wear.

Another feature of the present invention is the provision of a spline lubrication apparatus for lubricating a spline of a pump drive gearbox that is easy to disassemble.

A further feature of the present invention is the provision of a spline lubrication apparatus for lubricating a spline of a pump drive gearbox that reduces the cost of manufacture.

Other features and advantages of the present invention will be readily apparent to those skilled in the art by a consideration of the detailed description of a preferred embodiment of the present invention contained herein.

SUMMARY OF THE INVENTION

The present invention relates to a spline lubrication apparatus for lubricating a spline of a pump drive. The apparatus includes a gearbox housing and a rotatable spline which in use is disposed within the housing. The spline includes a shaft having a first and a second end and an external surface extending between the first and second ends of the spline, the external surface defining a plurality of longitudinally extending splines. A gear is rotatably supported by the housing, the gear defining an internally splined bore for the rotatable reception therein of the rotatable spline. The arrangement is such that the rotatable spline extends through the bore with the plurality of splines intermeshing with the internally splined bore. A bearing has a first and a second extremity, the bearing being disposed between the gear and the housing for bearingly supporting the gear for rotation within the housing. Also, a shield is disposed adjacent to one of the extremities of the bearing for diverting a portion of a flow of lubricant flowing through the bearing so that the portion of the flow of lubricant flows through the bore between the plurality of splines and the intermeshing internally splined bore for inhibiting fretting corrosion of the intermeshing splines and splined bore.

In a more specific embodiment of the present invention, the housing includes a first part and a second part removably cooperating with the first part such that the first and second parts together define an enclosure for the disposition therein of the spline, gear, bearing and shield.

Also, the spline is removably assembled within the internally splined bore.

Furthermore, the gear includes a rotatable sleeve which defines an annular collar which cooperates with the bearing. More specifically, the sleeve defines the internally splined bore.

In another embodiment of the present invention, the sleeve defines a further internally splined bore.

Additionally, an insert of cylindrical configuration is provided, the insert having a cylindrical surface which defines externally extending splines which cooperate with the further internally splined bore of the sleeve. The insert defines the internally splined bore which cooperates with the plurality of splines of the rotatable spline.

Moreover, the bearing includes an inner ring and an outer ring which is disposed concentrically relative to the inner ring. A bearing race is disposed between the rings.

In one embodiment of the present invention, the bearing race includes a plurality of ball bearings.

However, in another embodiment of the present invention, the bearing race includes a plurality of tapered bearings.

Throughout the specification, the term "bearing race" is to be understood as the plurality of ball bearings disposed between the concentrically disposed inner and the outer rings. The arrangement being such that the bearing includes a bearing race of the plurality of ball bearings disposed between the concentrically disposed inner and the outer rings.

Additionally, throughout the specification, the term "bearing race" in another embodiment is to be understood as the plurality of tapered bearings disposed between the concentrically disposed inner and the outer rings. The arrangement being such that the bearing includes a bearing race of the plurality of tapered bearings disposed between the concentrically disposed inner and the outer rings.

Furthermore, the gear and the bearing are self-contained within the housing.

Also, the shield is disposed within the flow of lubricant and downstream relative to the bearing.

However, in another embodiment of the present invention, the shield is disposed within the flow of lubricant and upstream relative to the bearing.

The shield is of annular configuration. More particularly, the shield shields the inner ring, the outer ring and the bearing race so that the portion of the flow of lubricant is diverted through the bore between the plurality of splines and the intermeshing internally splined bore for inhibiting fretting corrosion of the intermeshing splines and splined bore.

Also, the shield has an inner and an outer rim. The outer rim defines a ring which is divided into equidistantly spaced segments such that the ring permits anchoring of the shield relative to the bearing.

Many modifications and variations of the present invention will be readily apparent to those skilled in the art by a consideration of the detailed description contained hereinafter taken in conjunction with the annexed drawings which show a preferred embodiment of the present invention.

However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
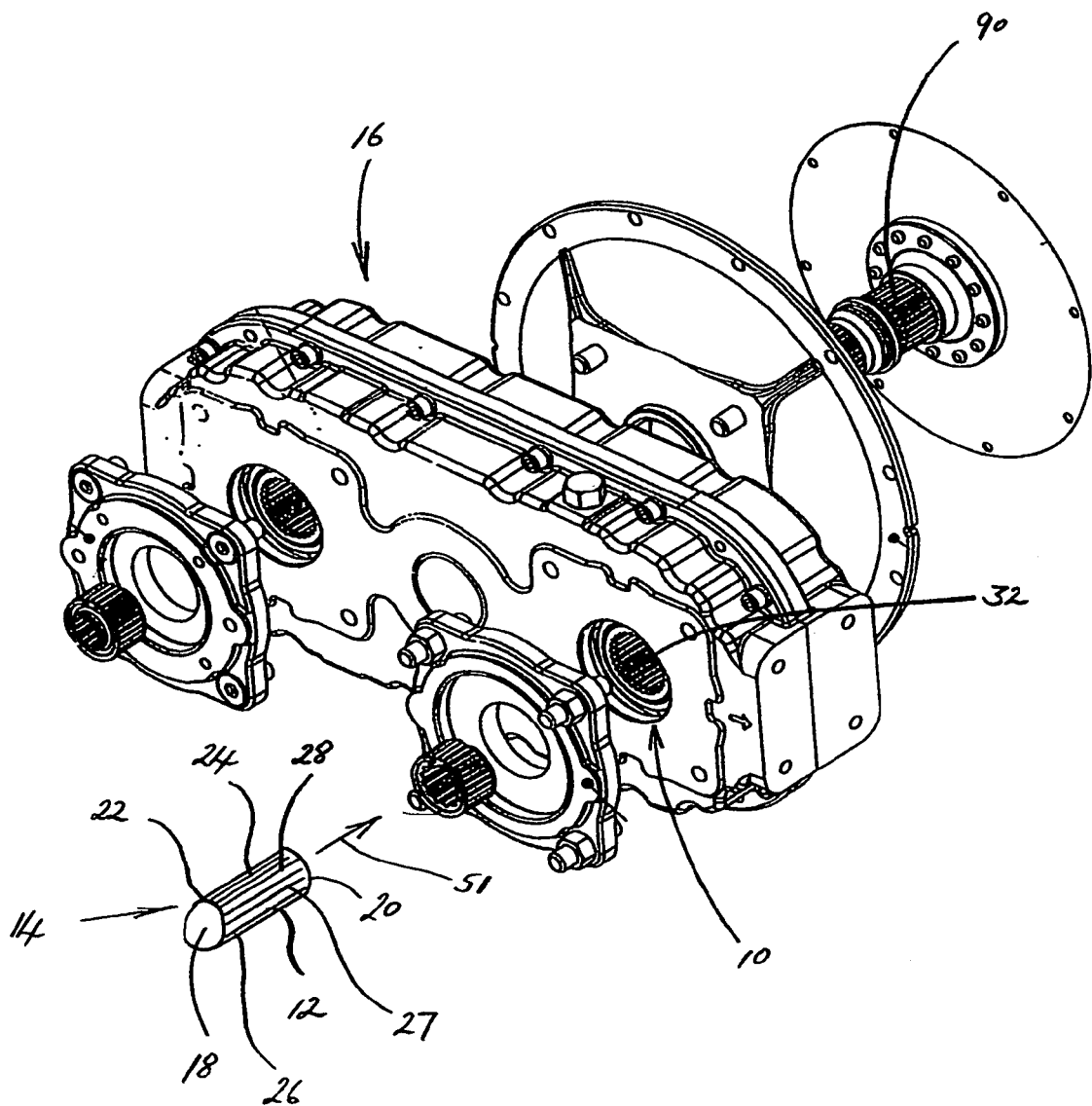
FIG. 1 is a perspective view showing a spline lubrication apparatus for lubricating a spline of a pump drive gearbox.

FIG. 1 is a perspective view showing a spline lubrication apparatus generally designated 10 for lubricating a spline generally designated 12 of a pump drive generally designated 14. As shown in FIG. 1, the apparatus 10 includes a gearbox housing generally designated 16 and the rotatable spline 12 for insertion into the housing 16. The spline 12 includes a shaft 18 having a first and a second end 20 and 22 respectively and an external surface 24 extending between the first and second ends 20 and 22 respectively of the spline 12, the external surface 24 defining a plurality of longitudinally extending splines 26, 27 and 28.

Figure 2:
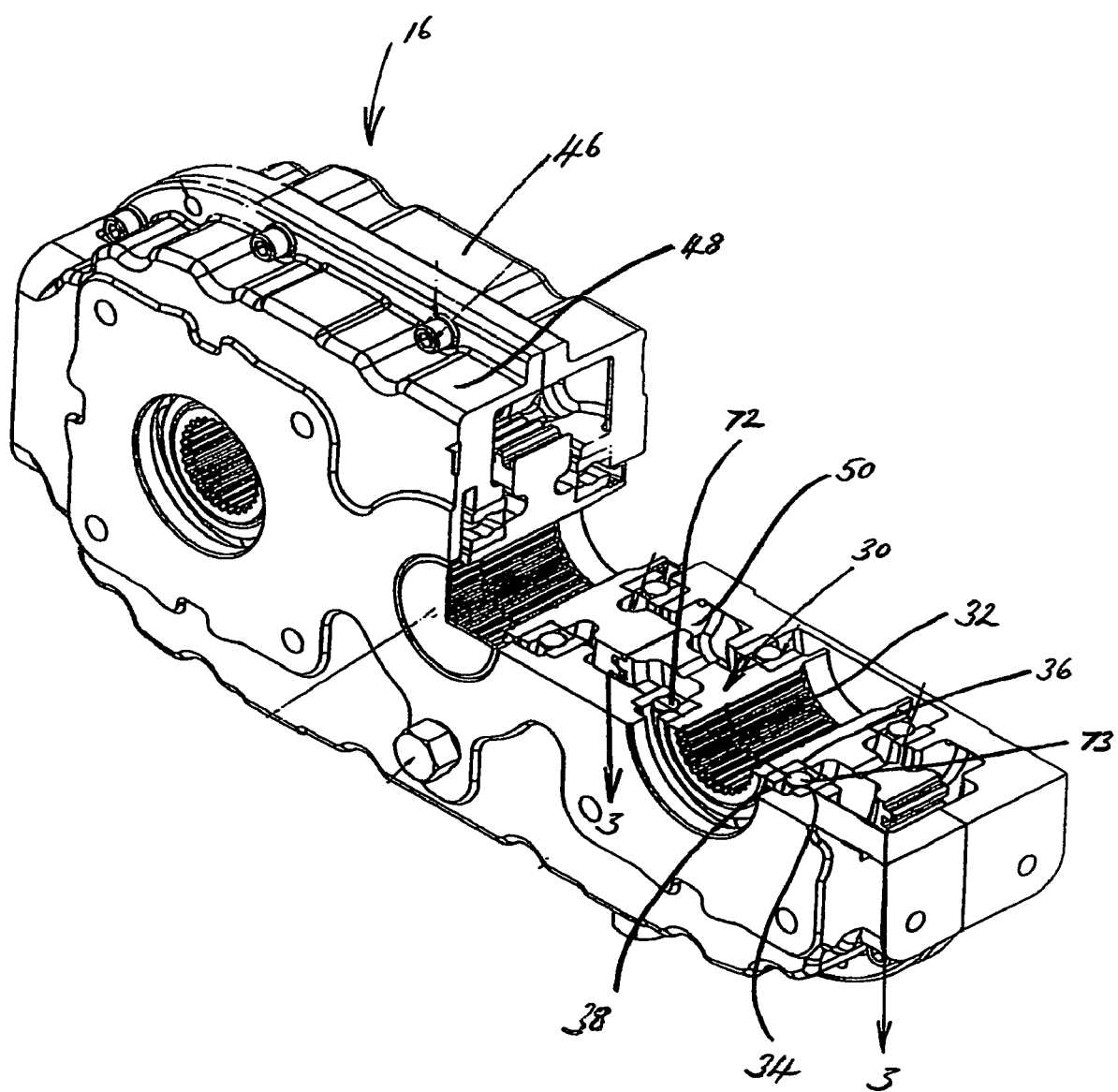
FIG. 2 is an enlarged view similar to that shown in FIG. 1 but partially cut away.

FIG. 2 is an enlarged view similar to that shown in FIG. 1 but partially cut away. As shown in FIG. 2, a gear generally designated 30 is rotatably supported by the housing 16, the gear 30 defining an internally splined bore 32 for the rotatable reception therein of the rotatable spline 12 shown in FIG. 1. The arrangement is such that the rotatable spline 12 extends through the bore 32 with the plurality of splines 26–28 intermeshing with the internally splined bore 32. A bearing generally designated 34 has a first and a second extremity 36 and 38 respectively, the bearing 34 being disposed between the gear 30 and the housing 16 for bearingly supporting the gear 30 for rotation thereof within the housing 16.

Figure 3:
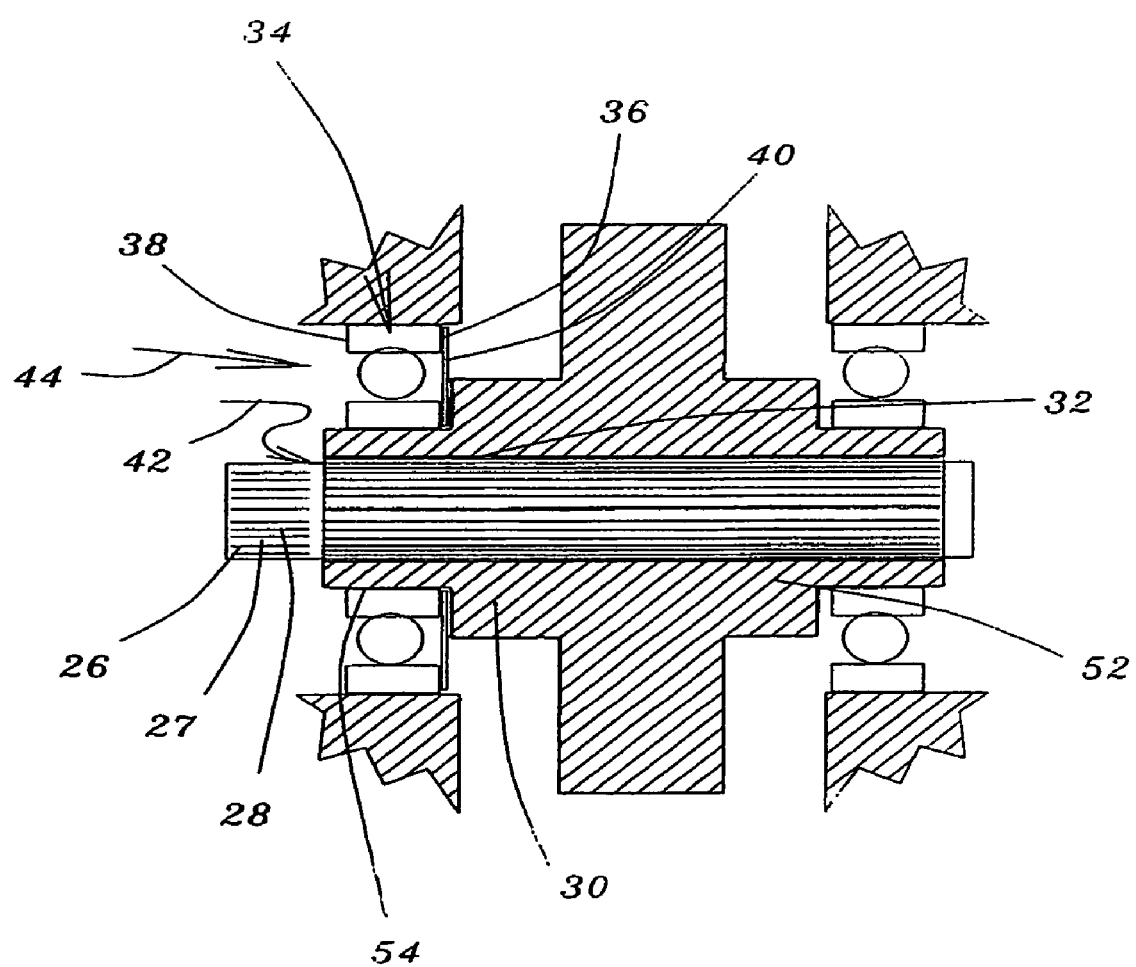
FIG. 3 is a sectional view taken on the line 3—3 of FIG. 2.

FIG. 3 is a sectional view taken on the line 3—3 of FIG. 2. As shown in FIG. 3, a shield generally designated 40 is disposed adjacent to one of the extremities 36 of the bearing 34 for diverting a portion as indicated by the arrow 42 of a flow of lubricant as indicated by the arrow 44 flowing through the bearing 34 so that the portion 42 of the flow of lubricant 44 flows through the bore 32 between the plurality of splines 26–28 and the intermeshing internally splined bore 32 for inhibiting fretting corrosion of the intermeshing splines 26–28 and the splined bore 32.

As shown in FIG. 2, the housing 16 includes a first part 46 and a second part 48 removably cooperating with the first part 44 such that the first and second parts 46 and 48 respectively together define an enclosure 50 for the disposition therein of the gear 30, bearing 34 and shield 40.

Also, as shown in FIG. 1 by the arrow 51, the spline 12 is removably assembled within the internally splined bore 32.

Furthermore, as shown in FIG. 3, the gear 30 includes a rotatable sleeve 52 which defines an annular collar 54 which cooperates with the bearing 34. More specifically, the sleeve 52 defines the internally splined bore 32.

Figure 4:
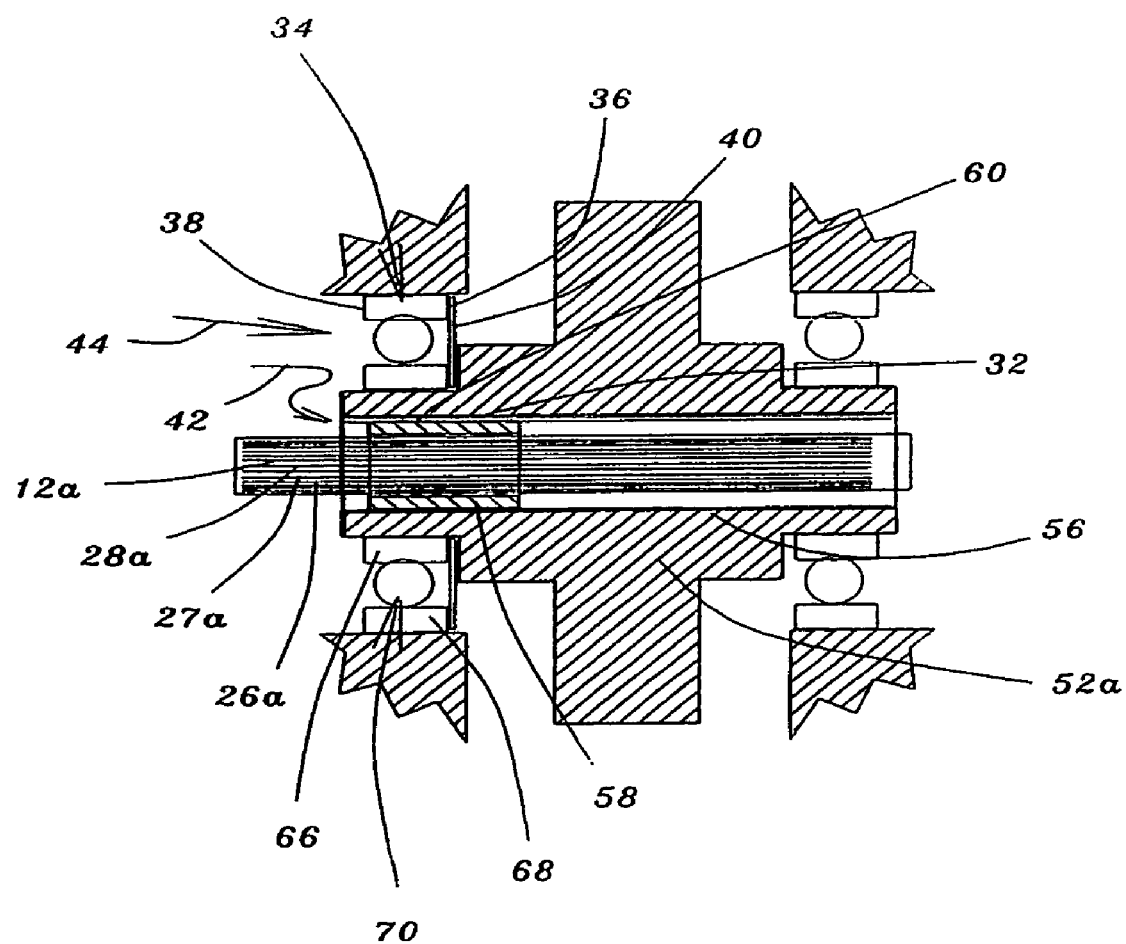
FIG. 4 is a view similar to that shown in FIG. 3 but showing another embodiment of the present invention.

FIG. 4 is a view similar to that shown in FIG. 3 but shows another embodiment of the present invention. As shown in FIG. 4, a sleeve 52a defines a further internally splined bore 56.

Additionally, an insert adapter 58 of cylindrical configuration is provided, the insert 58 having a cylindrical surface 60.

Figure 5:
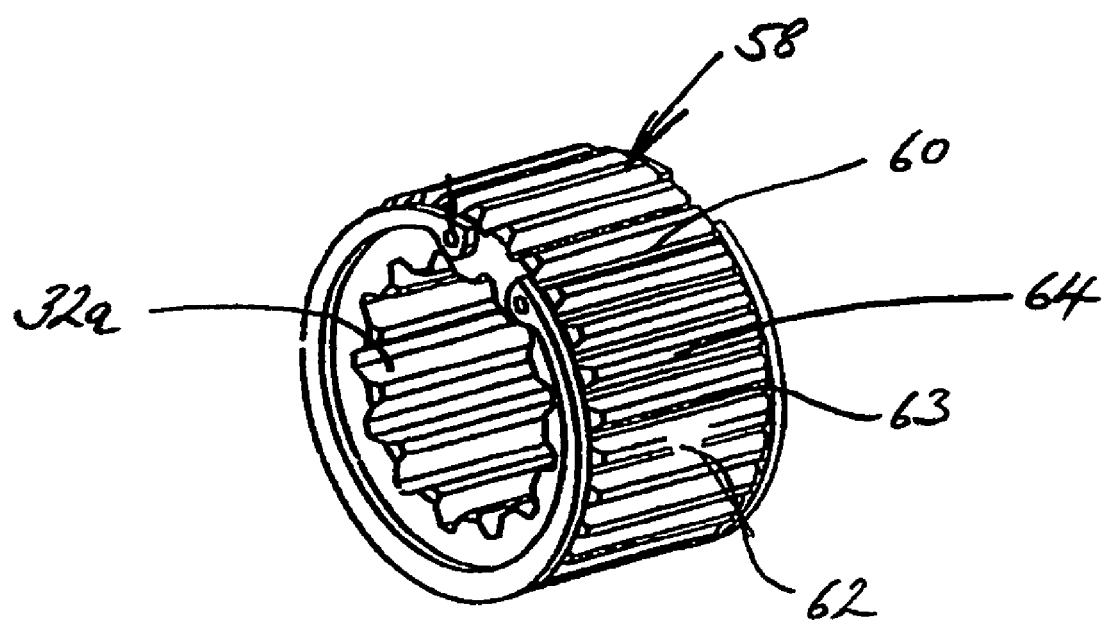
FIG. 5 is an enlarged perspective view of the insert adapter shown in FIG. 4.

FIG. 5 is an enlarged perspective view of the insert adapter 58 shown in FIG. 4. As shown in FIG. 5, the surface 60 of the insert 58 defines externally extending splines 62, 63 and 64 respectively which cooperate with the further internally splined bore 56 of the sleeve 52a as shown in FIG. 4. As shown in FIG. 5, the insert 58 defines an internally splined bore 32a which cooperates with a plurality of splines 26a, 27a and 28a of a rotatable spline 12a as shown in FIG. 4.

Moreover, as shown in FIG. 4, the bearing 34 includes an inner ring 66 and an outer ring 68 which is disposed concentrically relative to the inner ring 66. A bearing race generally designated 70 is disposed between the rings 66 and 68 respectively.

In one embodiment of the present invention, as shown in FIG. 2, the bearing race 70 includes a plurality of ball bearings 72 and 73.

Figure 6:
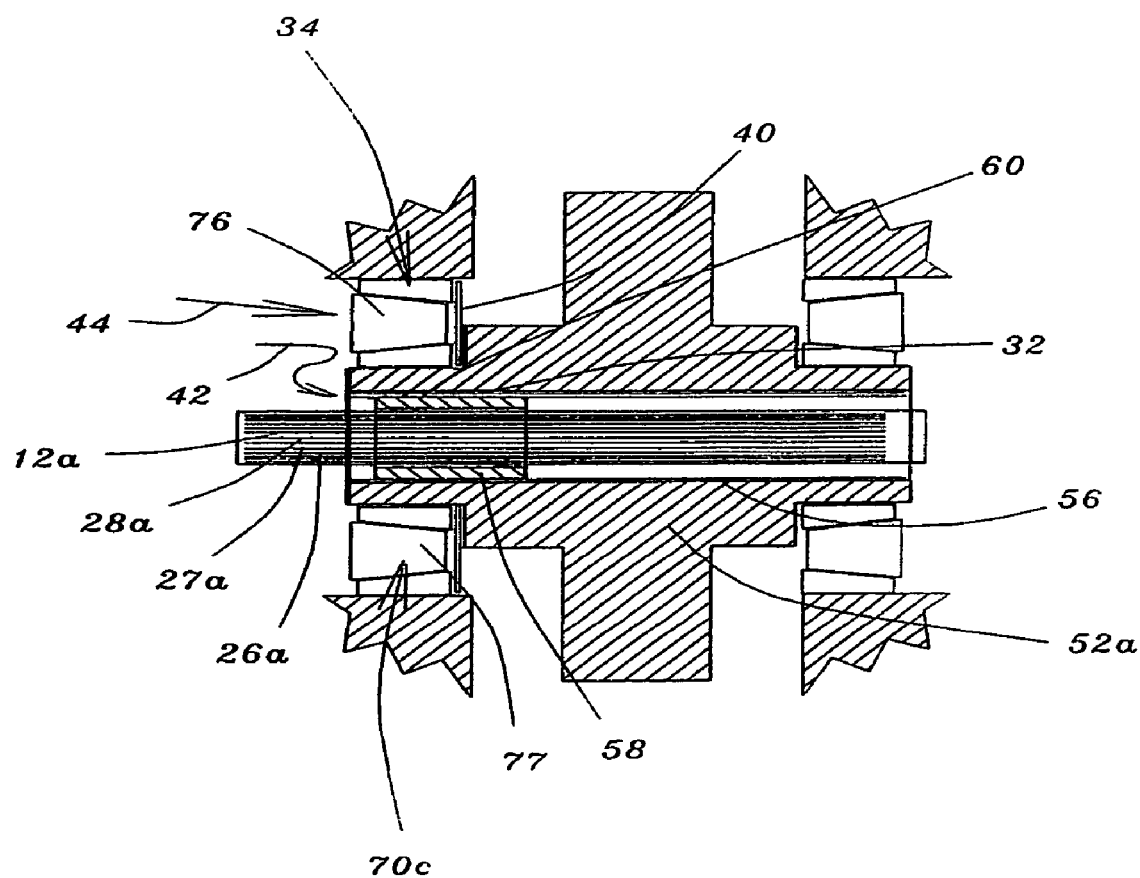
FIG. 6 is a view which is similar to that shown in FIG. 4 but shows another embodiment of the present invention.

FIG. 6 is a view which is similar to that shown in FIG. 4 but shows another embodiment of the present invention. As shown in FIG. 6, the bearing race 70c includes a plurality of tapered bearings 76 and 77 respectively.

Furthermore, the gear 30 and the bearing 34 are self-contained within the housing 16 as shown in FIG. 2.

Also, as shown in FIGS. 3, 4 and 6, the shield 40 is disposed within the flow of lubricant 44 and downstream relative to the bearing 34.

Figure 7:
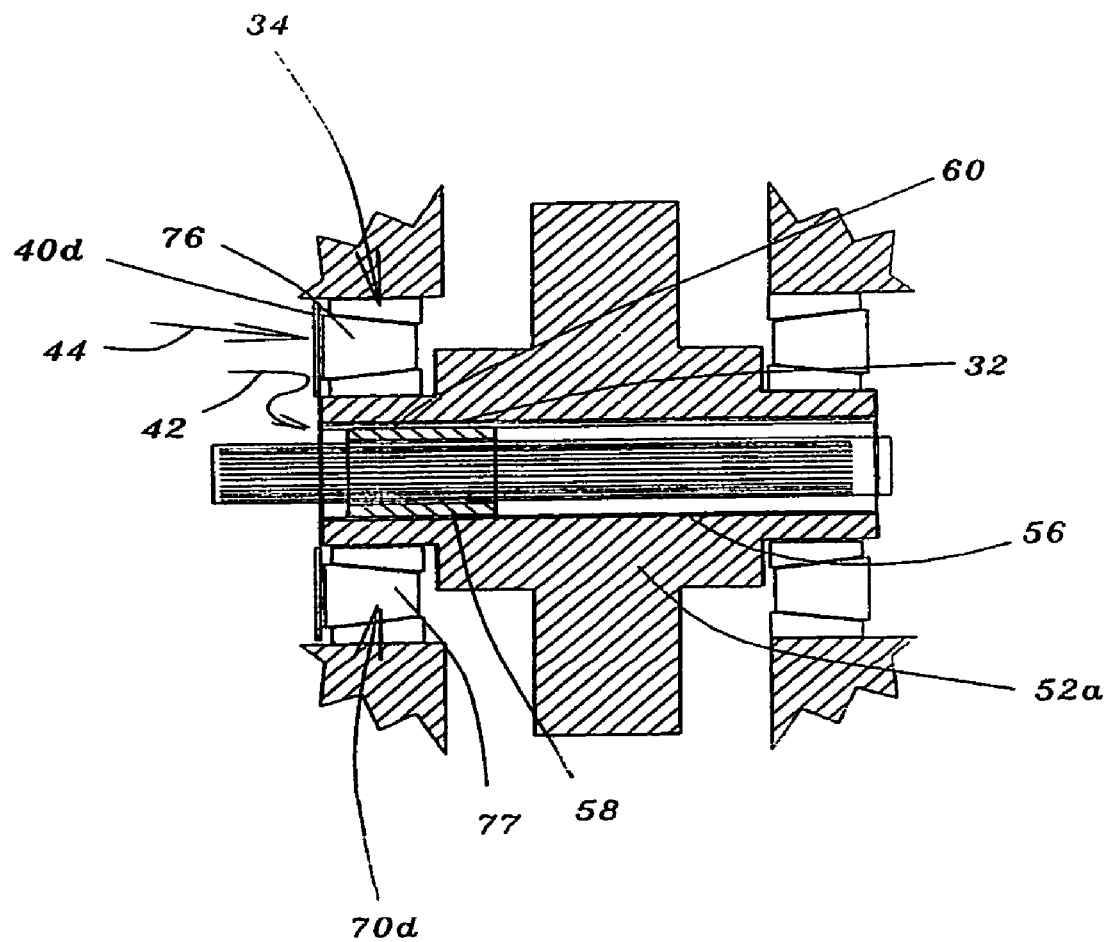
FIG. 7 is a similar view to that shown in FIG. 6 but shows yet another embodiment of the present invention.

FIG. 7 is a similar view to that shown in FIG. 6 but shows yet another embodiment of the present invention. As shown in FIG. 7, a shield 40d is disposed within the flow of lubricant 44 and upstream relative to the bearing 34.

Figure 8:
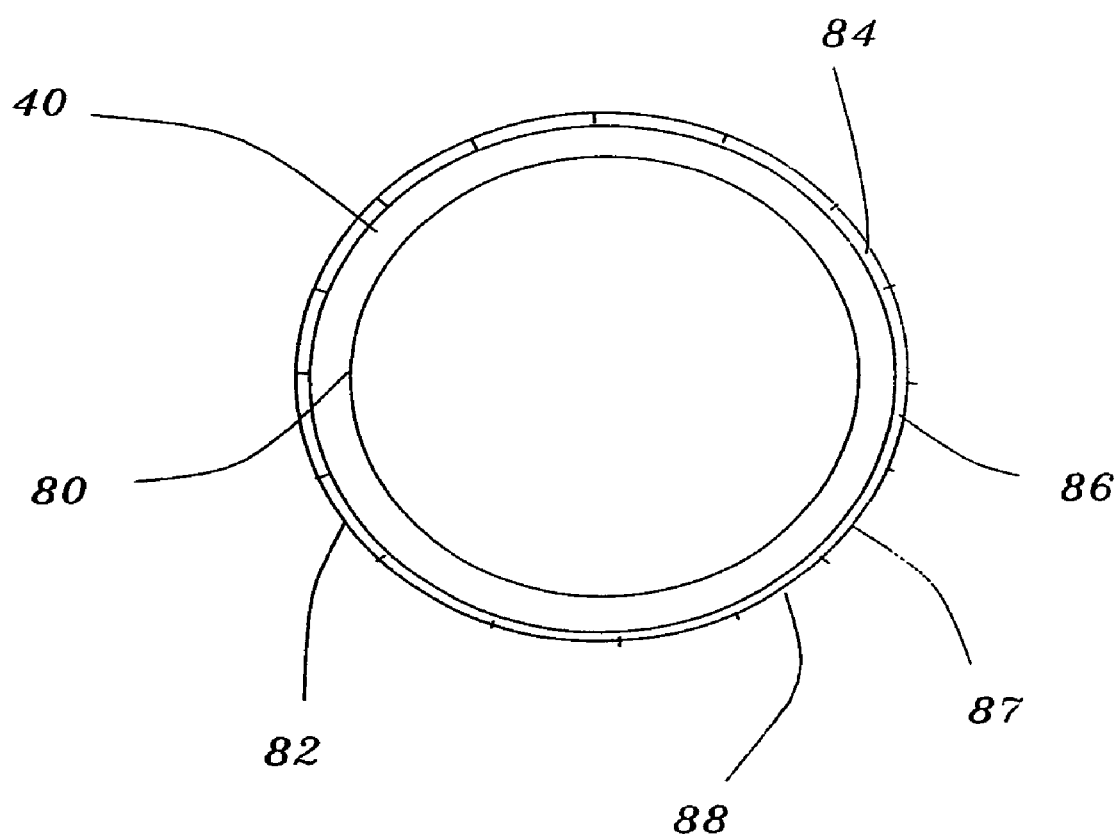
FIG. 8 is an enlarged view of the shield shown in FIGS. 3, 4, 6 and 7.

FIG. 8 is an enlarged view of the shield 40 shown in FIGS. 3, 4 and 6. As shown in FIG. 8, the shield 40 is of annular configuration. More particularly, the shield 40 shields the inner ring 66, the outer ring 68 and the bearing race 70 so that the portion 42 of the flow of lubricant 44 is diverted through the bore 32 between the plurality of splines 26–28 and the intermeshing internally splined bore 32 for inhibiting fretting corrosion of the intermeshing splines 26–28 and splined bore 32.

Also, the shield 40 has an inner and an outer rim 80 and 82 respectively. The outer rim 82 defines a ring 84 which is divided into equidistantly spaced segments 86, 87 and 88 respectively such that the ring 84 permits anchoring of the shield 40 relative to the bearing 34.

Figure 9:
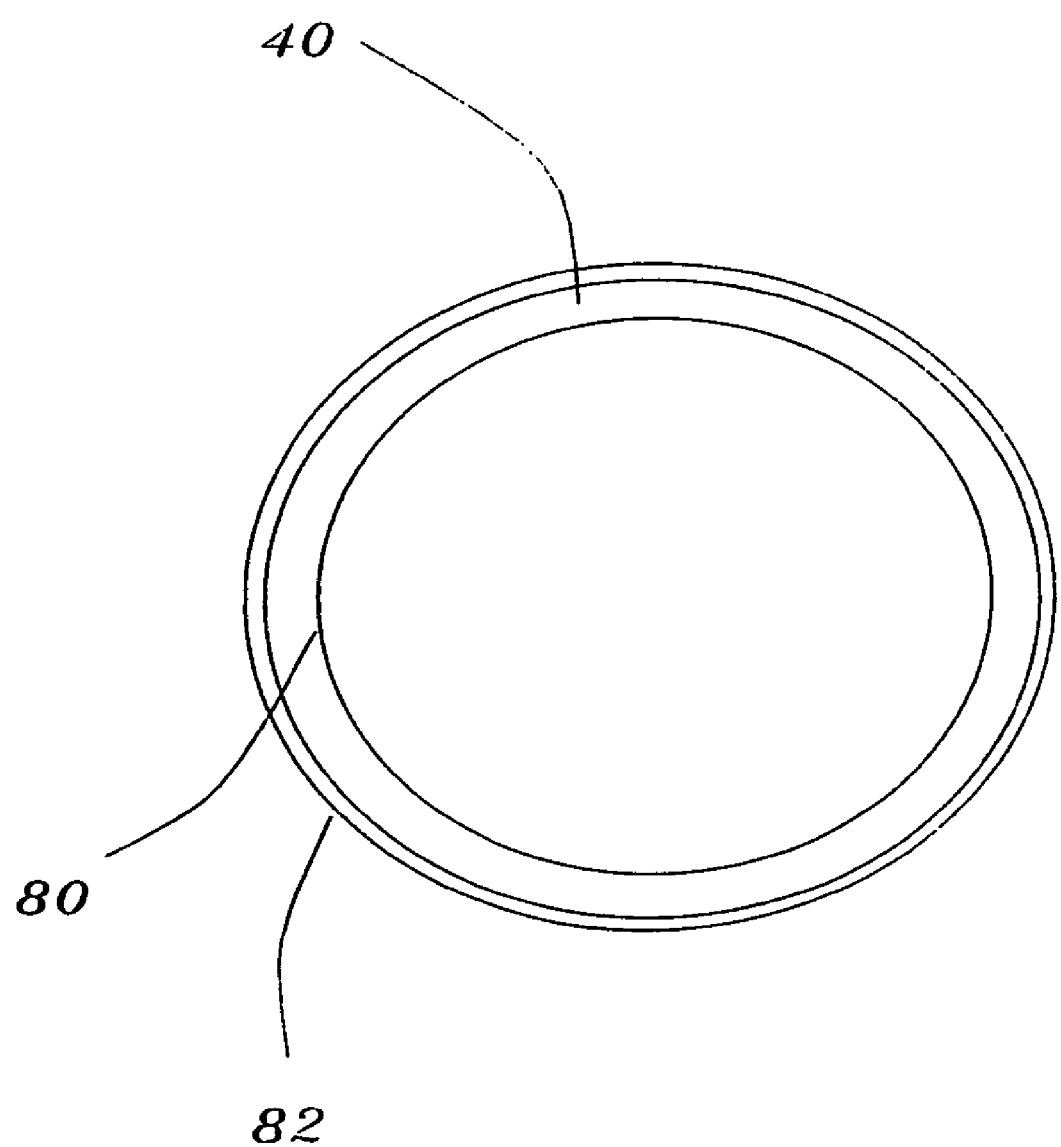
FIG. 9 is a similar view to that shown in FIG. 8 but viewed from the opposite side.

FIG. 9 is a similar view to that shown in FIG. 8 but viewed from the opposite side. As shown in FIG. 9, the shield 40 has the inner and outer rims 80 and 82 respectively.

In operation of the apparatus according to the present invention, the adapter insert 58 to match the spline 12 is inserted into the bore 32 so that the spline 12 for driving a pump (not shown) may be inserted into the insert 58 or into the bore 32 if no insert 58 is required. When the spline and pump are assembled, a drive generally designated 90 as shown in FIG. 1 drives the gear 30 which in turn rotates the spline 12.

When a pump with a different diameter spline is to be driven, it is only necessary for the second part 48 of the housing 16 as shown in FIG. 2 to be unbolted from the first part 46 of the housing. Subsequently, a matching adapter insert 58 can then be inserted within the bore 32.

Also, in the unlikely event of the need to replace a bearing, 34 the second part 48 is removed integrally with the attached pump so that one or more of the bearings 34 and/or the gear 30 can be slid out from the first part 46 of the housing 16 without any need for special equipment or any complex removal and replacement technique.

The present invention provides a unique arrangement for preventing excessive wear and fretting corrosion of splines particularly in pump drives.

What is claimed is:

1. A spline lubrication apparatus for lubricating a spline of a pump drive, said apparatus comprising:
   a housing;
   a shaft having a first and a second end and an external surface extending between said first and second ends, said external surface defining a plurality of longitudinally extending splines such that said shaft defines a rotatable spline disposed within said housing;
   a gear rotatably supported within said housing, said gear including an internally splined bore for the rotatable reception therein of said rotatable spline such that said rotatable spline extends through said bore with said plurality of splines intermeshing with said internally splined bore;
   a bearing having a first and a second extremity, said bearing being disposed between said gear and said housing for bearingly supporting said gear for rotation within said housing;
   a shield disposed adjacent to one of said extremities of said bearing for diverting a portion of a flow of lubricant flowing through said bearing so that said portion of said flow of lubricant flows through said bore between said plurality of splines and said intermeshing internally splined bore for inhibiting fretting corrosion of said intermeshing splines and splined bore;
   said gear including;
   a rotatable sleeve which defines an annular collar which cooperates with said bearing;
   said sleeve defining a further internally splined bore; and
   an insert of cylindrical configuration, said insert having a cylindrical surface which defines externally extending splines which cooperate with said further internally splined bore of said sleeve, said insert defining said internally splined bore which cooperates with said plurality of splines of said rotatable spline.

2. A spline lubrication apparatus as set forth in claim 1 wherein said housing includes:
   a first part;
   a second part removably cooperating with said first part such that said first and second parts together define an enclosure for the disposition therein of said spine, gear, bearing and shield.

3. A spline lubrication apparatus as set forth in claim 1 wherein said spline is removably assembled within said internally splined bore.

4. A spline lubrication apparatus as set forth in claim 1 wherein said gear includes:
   a rotatable sleeve which defines an annular collar which cooperates with said bearing.

5. A spline lubrication apparatus as set forth in claim 4 wherein said sleeve defines said internally splined bore.

6. A spline lubrication apparatus as set forth in claim 1 wherein said bearing includes:
   an inner ring;
   an outer ring disposed concentrically relative to said inner ring;
   a bearing race disposed between said rings.

7. A spine lubrication apparatus as set forth in claim 6 wherein said bearing race includes:
   a plurality of ball bearings.

8. A spline lubrication apparatus as set forth in claim 6 wherein said bearing race includes:
   a plurality of tapered bearings.

9. A spline lubrication apparatus as set forth in claim 6 wherein said shield is of annular configuration, said shield shielding said inner ring, said outer ring and said bearing race so that said portion of said flow of lubricant is diverted through said bore between said plurality of splines and said intermeshing internally splined bore for inhibiting fretting corrosion of said intermeshing splines and splined bore.

10. A spline lubrication apparatus as set forth in claim 1 wherein said gear and said bearing are self-contained within said housing.

11. A spline lubrication apparatus as set forth in claim 1 wherein said shield is disposed within said flow of lubricant and downstream relative to said bearing.

12. A spline lubrication apparatus as set forth in claim 1 wherein said shield is disposed within said flow of lubricant and upstream relative to said bearing.

13. A spline lubrication apparatus as set forth in claim 1 wherein said shield is of annular configuration.

14. A spline lubrication apparatus for lubricating a spline of a pump drive, said apparatus comprising: a housing:
   a shaft having a first and a second end and an external surface extending between said first and second ends, said external surface defining a plurality of longitudinally extending splines such that said shaft defines a rotatable spline disposed within said housing;
   a gear rotatably supported within said housing, said gear including an internally splined bore for the rotatable reception therein of said rotatable spline such that said rotatable spline extends through said bore with said plurality of splines intermeshing with said internally splined bore;
   a bearing having a first and a second extremity, said bearing being disposed between said gear and said housing for bearingly supporting said gear for rotation within said housing;
   a shield disposed adjacent to one of said extremities of said bearing for diverting a portion of a flow of lubricant flowing through said bearing so that said portion of said flow of lubricant flows through said bore between said plurality of splines and said intermeshing internally splined bore for inhibiting fretting corrosion of said intermeshing splines and splined bore;
   said shield being of annular configuration having an inner and an outer rim; and
   said outer rim defining a ring which is divided into equidistantly spaced segments such that said ring permits anchoring of said shield relative to said bearing.

* * * * *